UNITED STATES PATENT OFFICE.

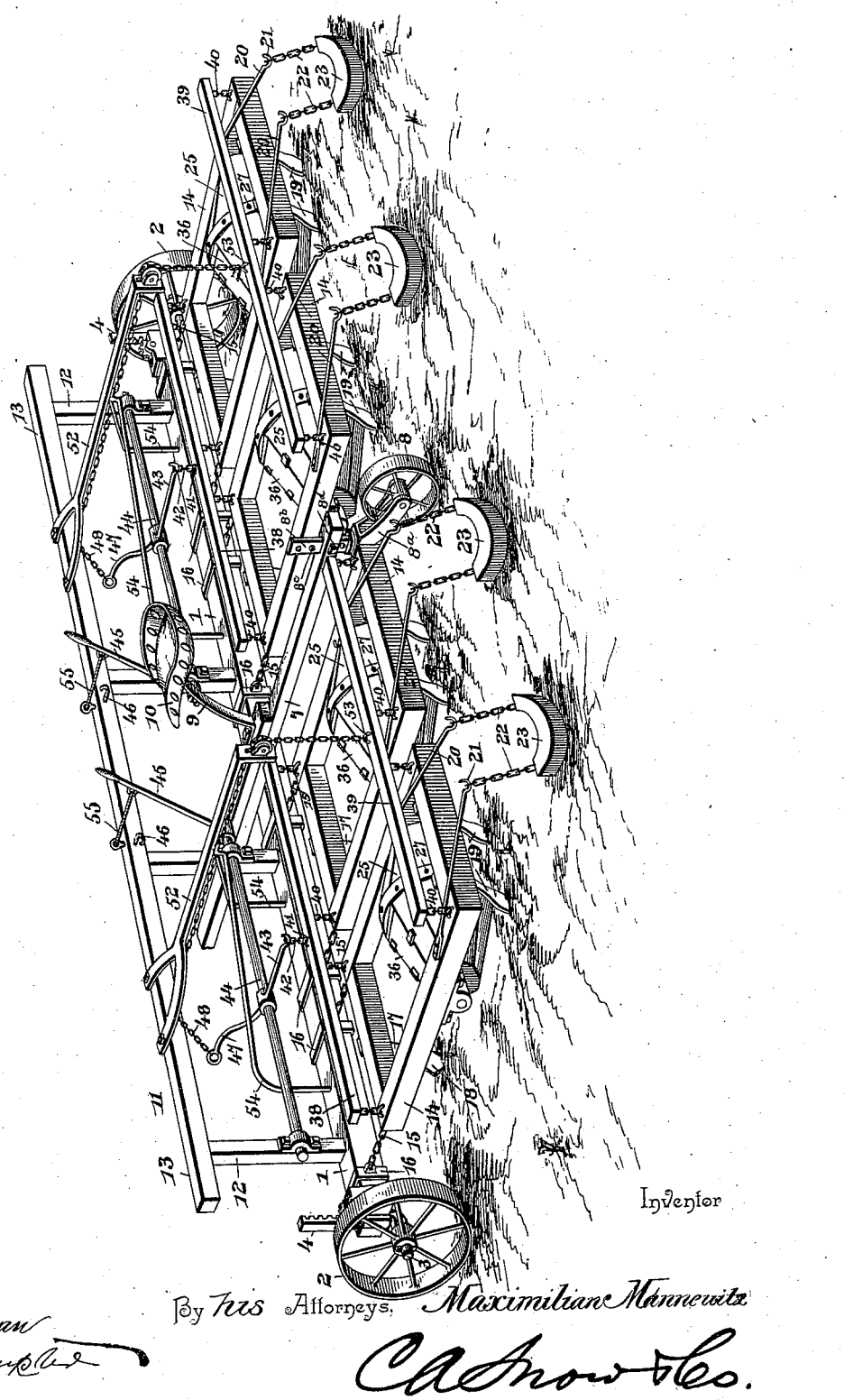

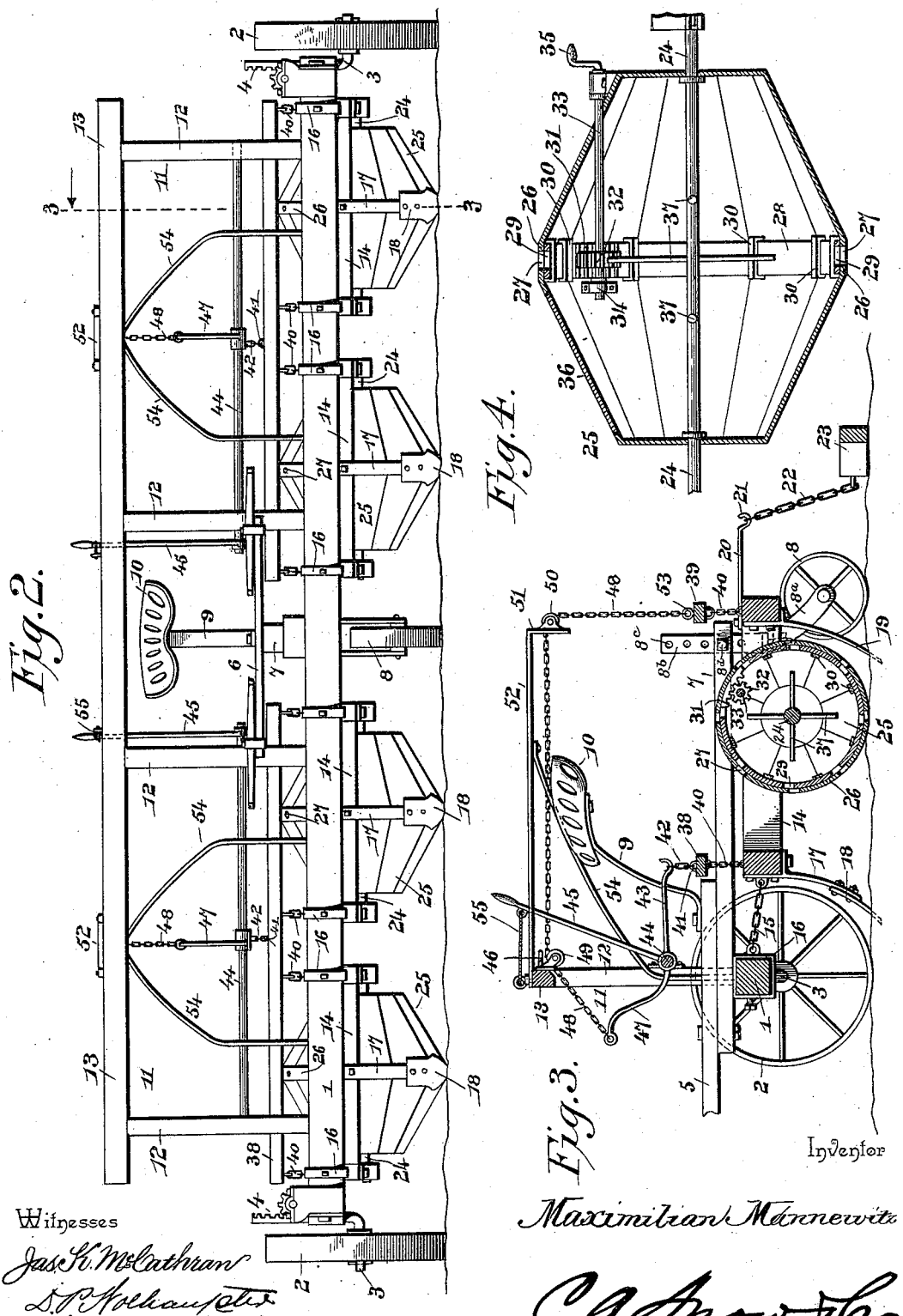

MAXIMILIAN MANNEWITZ, OF ABILENE, TEXAS.

SEED-PLANTER.

SPECIFICATION forming part of Letters Patent No. 574,554, dated January 5, 1897.

Application filed September 1, 1896. Serial No. 604,545. (No model.)

*To all whom it may concern:*

Be it known that I, MAXIMILIAN MANNEWITZ, a citizen of the United States, residing at Abilene, in the county of Taylor and State of Texas, have invented a new and useful Seed-Planter, of which the following is a specification.

This invention relates to seed-planters; and it has for its object to provide a seed-planter capable of planting corn, cotton, and any other kind of seed sowed or planted in rows, such as peas, beans, broom-corn, and the like.

To this end the invention primarily contemplates a construction of seed-planter providing positive and efficient means for planting any desired number of rows at one time, while at the same time having means for opening the furrow, dropping the seed, and covering up the furrow in one operation.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a seed-planter constructed in accordance with the present invention. Fig. 2 is a front elevation thereof. Fig. 3 is a vertical sectional view on the line 3 3 of Fig. 2. Fig. 4 is an enlarged longitudinal sectional view of one of the rolling hopper-drums.

Referring to the accompanying drawings, the numeral 1 designates a single continuous draft-axle that is sufficiently long to span the greatest number of rows which the machine is capable of planting at one time, and said draft-axle 1 is supported at its opposite extremities on the opposite ground-wheels 2, mounted on the stub-axles 3, having an adjustable connection 4 with opposite ends of the draft-axle, whereby such axle can be adjusted toward and away from the ground, according as the machine is in or out of operation. Any suitable adjustable connection 4 may be employed for connecting the opposite ends of the draft-axle with the ground-wheels, whereby the draft-axle may be raised and lowered, as desired. The vertically-adjustable wheeled draft-axle 1 has centrally connected thereto the inner end of the draft-tongue 5, carrying the usual doubletree 6, and the said axle 1 also has secured thereto one end of the central rearwardly-extending reach-bar 7, arranged in line with the draft-tongue 5 and carrying at its rear extremity a central guide wheel or caster 8, which supports the machine in an upright position and steadies the same in its travel over the ground. The guide wheel or caster 8 is journaled in a bearing-yoke $8^a$, swiveled at the lower end of a vertical adjustable standard $8^b$, provided with a series of bolt-openings $8^c$ and adapted to work through an opening formed in the reach-bar 7 near its rear end. A securing-bolt $8^d$ is passed through the reach-bar 7 and engages with any one of the series of bolt-openings $8^c$ in the standard $8^b$ to provide for securing the latter in any vertical adjusted position, and by reason of this adjustment the guide wheel or caster 8 may be adjusted to correspond with the adjustment of the ground-wheels 2. The said central rearwardly-extending reach-bar 7, carrying the guide wheel or caster 8, also supports thereon the seat-arm 9, carrying the driver's seat 10, which is disposed in rear of the central portion of the upright frame 11, supported on top of the draft-axle 1.

The upright frame 11, supported on top of the draft-axle 1, essentially comprises a series of upright frame-posts 12, suitably joined with the axle at their lower ends, and a transverse frame-beam 13, supported on the upper ends of the upright posts 12 and lying parallel with and above the axle, the purpose of the frame 11 being hereinafter more particularly referred to in connection with the elevation or adjustment of the rectangular hopper-frames 14, arranged to work in rear of the main draft-axle.

The rectangular hopper-frames 14 are arranged in groups at opposite sides of the central rearwardly-extending reach-bar 7 of the draft-axle, and the requisite number of said hopper-frames are employed, according to the number of rows to be planted, and are spaced the proper distance apart, according to the distance between the rows. The front ends of the rectangular hopper-frames 14 have connected thereto one end of the short drag-chains 15, the other ends of which drag-chains are loosely connected to the rectangular clamp-loops 16, adjustably embracing the draft-axle 1, to provide a connection between such axle and the hopper-frames and also to provide for adjustably connecting the said hopper-frames to the draft-axle, according to the distance between the rows being planted. The rectangular hopper-frames 14 are flexibly connected with the draft-axle by means of the short drag-chains, so that said frames have an independent movement to adjust themselves to inequalities in the ground, and each hopper-frame has secured centrally to the front end thereof the plow-standard 17, carrying at its lower end the opening plow-shovel 18 for opening up the furrow to receive the seed that is being dropped, while the rear end of each rectangular hopper-frame has bolted or otherwise suitably fastened thereto a pair of covering-shovels 19, which provide for covering up the furrows that have received the seed. In addition to the covering-shovels 19, carried by the rear ends of the hopper-frames, each hopper-frame has secured to opposite sides thereof and at its rear end a pair of rearwardly-convergent supporting-arms 20, having connected to their outer ends, as at 21, the upper ends of short connecting-chains 22, the lower ends of which chains are loosely connected to the upper side of a horizontal covering drag-shoe 23, trailing loosely over the ground in rear of the covering-shovels 19 and in line with the center of the hopper-frame to positively insure the proper covering of the furrow, and in connection with the use of the covering-shovels and drag-shoe for each hopper-frame it is to be noted that the drag-shoe for each hopper-frame is used with the covering-shovels only in heavy or waxy soil or rough ground; but in sandy land the pair of shovels 19 at the rear end of each hopper-frame is sufficient to provide for a proper covering of the furrow in which the seed is planted.

Intermediate of its front and rear ends each rectangular hopper-frame 14 has mounted in its opposite parallel side portions the opposite ends of a transverse stationary hopper-axle 24, on which is loosely mounted to rotate a transverse rolling hopper-drum 25, adapted to hold the seed to be planted. The rolling hopper-drums 25, carried by the rectangular hopper-frames 14, are polygonal in cross-section and contracted toward both ends to provide a central annular ridge portion 26, toward which the seed necessarily runs from both ends of the drums, and will therefore be entirely discharged therefrom. The rolling hopper-drums 25 are provided in their central annular ridge portions 26 with a circular series of regularly-spaced dropping-openings 27, the size of which openings is regulated by an adjustable continuous interior feed-regulating slide-band 28. The continuous interior slide-band for each rolling hopper-drum 25 works within the drum at the inner side and against the central ridge portion 26 thereof, and said slide-band is also provided with a series of seed-openings 29, adapted to be thrown in and out of alinement with the dropping-openings 27 to properly regulate the size of such openings according to the character of the seed being planted. The interior circular slide-band 28 for each rolling hopper-drum 25 slides through a series of guide-loops 30, secured within the hopper-drum at the angles thereof, and said feed-regulating slide-band 28 is provided with a short rack portion 31, with which meshes an adjusting-pinion 32, mounted on shaft 33, arranged to work within each hopper-drum. Each shaft 33 is journaled at its inner end in a suitable bearing 34, arranged within the hopper-drum, and the outer end of said shaft is extended through one end of the hopper-drum and carries at such end a crank-handle 35, which is manipulated to provide for turning the pinion 32 and securing the desired adjustment of the feed-regulating slide-bands 28.

By reason of the arrangement of the dropping-openings in the hopper-drums it will be obvious that the seed will drop therefrom as the same roll over the ground with their central ridge portions 26 traveling in the furrows made by the opening-shovels at the front ends of the hopper-frames, and when the hopper-drums are entirely emptied the same may be readily refilled through the doors 36, working over door-openings formed in the drums at one side of their central ridge portions. A proper stirring of the seed within the hopper-drums is insured by fitting to the stationary hopper-axles within the drums a series of crossed stirrer-arms 37, which, as the hopper-drums revolve about their axles, provide means for stirring up the seed and preventing the same from clogging within the dropping-openings of the drums.

In the drawings a pair of rectangular hopper-frames, carrying rolling seed-drums and furrow opening and closing devices, is illustrated as arranged at opposite sides of the central rearwardly-extending reach-bar 7 of the draft-axle, and each of said oppositely-arranged pairs of hopper-frames is designed to be adjusted up and down by front and rear suspension-bars 38 and 39, arranged, respectively, over the front and rear ends of each pair of hopper-frames. The front and rear suspension-bars 38 and 39 are arranged transversely of the hopper-frames thereabove and extend across the space between the central reach-bar 7 and the opposite ends of the draft-axle, and said suspension-bars have flexible connections 40 with the corners of the hopper-frames directly therebelow. Each of the front transversely-arranged suspension-bars 38 is loosely connected at its center, as at 41, to one end of a short adjusting-chain 42, the other end of which chain connects with a rock-arm 43, projected at one side of and centrally from a rock-shaft 44, journaled in suitable bearings on oppositely-located posts 12 of the upright frame 11.

Each rock-shaft 44 for each set of hopper-frames is located at one side of the central reach-bar 7, and has fitted to its inner end one end of an adjusting-lever 45, arranged at the rear side of the upright frame 11 within easy reaching distance of the driver's seat 10, and the said adjusting-levers 45 for the rock-shafts 44 are adapted to engage with catch-hooks 46 or other similar catch devices on the frame 11, which provide means for locking the levers 45 to prevent the rock-shafts 44 from turning when the hopper-frames have been elevated so as to lift the rolling hopper-drums off of the ground when out of operation. The oppositely-located rock-shafts 44 are entirely independent of each other, so that one set of hopper-carrying frames may be in use while the opposite set of said frames are elevated to an inoperative position, and in addition to the rock-arms 43 the said rock-shafts 44 are each further provided centrally between their ends with a second rock-arm 47, disposed at an angle to the rock-arm 43 and having attached thereto one end of an elevating chain or rope 48. The elevating chains or ropes 48, connected with the rock-arms 47 of the shafts 44, extend upward from their connections with said rock-arms and pass over the guide-pulleys 49 and 50, mounted, respectively, at the rear side of the frame-beam 13 and at the rear downturned angled ends 51 of the supporting-brackets 52. From the guide-pulleys 51, mounted at the rear ends of the supporting-brackets 52, the elevating chains or ropes 48 extend downward and connect centrally at 53 with the rear suspension-bars 39, flexibly connected with the rear ends of the hopper-carrying frames.

The supporting-brackets 52 are arranged above the front and rear suspension-bars above the opposite sets of hopper-carrying frames, and are suitably connected at their front ends with the upper horizontal frame-beam 13 of the upright frame 11, and the rear ends of the said brackets 52 are braced by a pair of brace-rods 54, connected at their upper ends with the under sides of the brackets 52, near their rear ends, and forwardly diverging toward the main draft-axle 1, to which they are connected at their lower ends, thereby serving to properly sustain the brackets 52 in a horizontal position and enable them to support the weight of the hopper-carrying frames when elevated.

When it is desired to put all of the hopper-carrying frames in operation, both rock-shafts 44 are turned in a direction to slack the adjusting connections with the suspension-bars 38 and 39, thereby lowering such suspension-bars and allowing the rolling hopper-drums to drop onto the ground, so as to roll thereon and distribute or drop the seed in the furrows opened up by the advance opening-shovels; but when it is desired to throw the machine out of operation the adjusting-levers 45 are moved into engagement with the catch-hooks 46, thereby turning the rock-shafts 44 in a direction to draw upon the short adjusting-chains 42 and the elevating chains or ropes 48, which will elevate the front and rear suspension-bars and the hopper-carrying frames loosely suspended therefrom, as will be readily apparent to those skilled in the art. When the adjusting-levers 45 are disengaged from their catch connections 46, the same are preferably prevented from dropping down out of the way by the limiting ropes or chains 55, connected at one end with the said levers 45 and at their other ends with the upright frame 11.

While a pair of hopper-carrying frames is illustrated as loosely suspended from each pair of vertically-adjustable suspension-bars, it will be obvious that by using smaller-sized hopper-carrying frames or increasing the width of the machine any desired number of said hopper-frames may be suspended from each pair of suspension-bars, whereby any number of rows may be planted at one time, and in planting certain kinds of small seed very small hopper-drums are necessary, so that it will be obvious that a number of smaller hopper-carrying frames may be substituted for the larger size of frames illustrated in the drawings without altering the construction or operation of the machine in any particular. When a larger number of the smaller hopper-drums are employed, no substantial change is made in the construction of the machine, excepting the duplication of the drums, to provide for planting a large number of rows of seed at the same time; but in using the smaller drums the opening-shovels 18 may be dispensed with and a rake substituted therefor, as will be quite obvious, while a continuous covering-bar may be substituted for the trailing drag-shoes 23, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a seed-planter, the combination of a wheeled draft-axle having a central rearwardly-extending reach-bar carrying at its rear end a guide wheel or caster and supporting a driver's seat, transversely-alined hopper-carrying frames arranged at opposite sides of said reach-bar and flexibly connected at their front ends with said draft-axle, said hopper-frames carrying furrow opening and closing devices, and rolling hopper-drums loosely journaled within said frames, substantially as set forth.

2. In a seed-planter, a wheeled draft-axle, transversely-alined hopper-frames arranged in rear of the draft-axle and flexibly connected at their front ends thereto, said frames carrying furrow openers and coverers and seed-hoppers, suspension devices for said hopper-frames, and means for adjusting the suspension devices for raising and lowering the hopper-frames, substantially as set forth.

3. In a seed-planter, a long wheeled draft-axle having a central rearwardly-extending reach-bar carrying a guide-wheel, horizontal suspension-bars arranged at opposite sides of the reach-bar in rear of the draft-axle, adjusting means for raising and lowering said suspension-bars, and a plurality of hopper-frames loosely suspended from said suspension-bars and flexibly connected at their front ends with the draft-axle, substantially as set forth.

4. In a seed-planter, a long wheeled draft-axle, a pair of horizontal suspension-bars arranged in rear of the draft-axle, adjusting means for supporting the suspension-bars and providing for raising and lowering the same, and a plurality of transversely-alined hopper-frames loosely hung at their front and rear ends respectively from said front and rear suspension-bars and flexibly connected at their front ends with the draft-axle, said hopper-frames carrying furrow openers and coverers and rolling seed-hoppers, substantially as set forth.

5. In a seed-planter, a long wheeled draft-axle having a central rearwardly-extending reach-bar carrying a guide-wheel, an upright frame mounted on top of said axle, a pair of front and rear horizontal suspension-bars arranged at opposite sides of the reach-bar in rear of the draft-axle, a plurality of transversely-alined hopper-frames loosely hung at their front and rear ends respectively from each pair of front and rear suspension-bars and flexibly connected at their front ends with the draft-axle, said hopper-frames carrying furrow openers and coverers and rolling seed-hoppers, supporting-brackets extending rearwardly from the top of said upright frame over each pair of suspension-bars and carrying at their rear ends guide-pulleys, separate guide-pulleys mounted on the upright frame adjacent to the front ends of said rearwardly-extending brackets, horizontal lever-adjusted rock-shafts journaled on the upright frame at opposite sides of the central reach-bar and provided with a pair of offstanding rock-arms, a flexible connection between one rock-arm of each rock-shaft and the adjacent front suspension-bar, and an elevating chain or rope connected at one end with the other rock-arm of each rock-shaft, passing over said guide-pulleys, and connected at its other end with the rear suspension-bar directly in rear of such rock-shaft, substantially as set forth.

6. In a seed-planter, a long wheeled draft-axle, transversely-alined hopper-frames arranged in rear of the draft-axle and flexibly connected at their front ends thereto, rolling hopper-drums loosely mounted in said frames, furrow-opening shovels mounted at the front ends of said hopper-frames, a pair of covering-shovels mounted at the rear ends of the hopper-frames, a pair of rearwardly-convergent supporting-arms extended rearwardly from the rear ends of the hopper-frames, and horizontal covering drag-shoes flexibly connected with said supporting-arms, substantially as set forth.

7. In a planter, the combination with a hopper-carrying frame; of a stationary hopper-axle mounted transversely in the frame, a rolling hopper-drum loosely mounted on the hopper-axle, said hopper-drum being polygonal in cross-section and contracted toward both ends to provide a central annular ridge portion having a circular series of regularly-spaced dropping-openings, a circular interior slide-band guided for movement within the drum at the inner side and against the central ridge portion thereof and provided with a series of seed-openings adapted to be thrown in and out of alinement with the dropping-openings of the drum, said feed-regulating slide-band being further provided with a short rack portion, and a crank-operated shaft journaled within the drum and carrying a pinion meshing with said rack portion of the slide-band, substantially as set forth.

8. In a seed-planter, a horizontal wheeled draft-axle, a plurality of transversely-alined hopper-frames arranged in rear of the axle and flexibly connected at their front ends thereto, rolling hopper-drums mounted in said frames, suspension devices having flexible connections with the front and rear ends of all of the hopper-frames, and means for adjusting the suspension devices to provide for raising and lowering the hopper-frames with the drums carried thereby, substantially as set forth.

In testimony that I claim the foregoing as my own I have hereto affixed my signature in the presence of two witnesses.

MAXIMILIAN MANNEWITZ.

Witnesses:
   J. T. CLARK,
   A. BOULTER.